United States Patent [19]

Paulsson et al.

[11] Patent Number: 4,780,214

[45] Date of Patent: Oct. 25, 1988

[54] TREATMENT OF MERCURY CONTAMINATED LAKES

[75] Inventors: Karin M. Paulsson, Skelleftehamm; Arne Björnberg, Täby, both of Sweden

[73] Assignee: Boliden Aktiebolag, Stockholm, Sweden

[21] Appl. No.: 99,732

[22] Filed: Sep. 22, 1987

[30] Foreign Application Priority Data

Oct. 3, 1986 [SE] Sweden ............................... 8604211

[51] Int. Cl.$^4$ ................................ C02F 1/62
[52] U.S. Cl. ................................ 210/719; 210/747; 210/914
[58] Field of Search ............ 210/602–719, 210/721, 747, 757, 914, 912

[56] References Cited

U.S. PATENT DOCUMENTS

| | | | |
|---|---|---|---|
| 3,679,396 | 7/1972 | Stenger | 210/914 X |
| 4,354,942 | 10/1982 | Kaczur et al. | 210/747 X |
| 4,432,880 | 2/1984 | Talbot | 210/912 X |
| 4,578,195 | 3/1986 | Moore et al. | 210/914 X |
| 4,604,321 | 8/1986 | Okahara et al. | 210/914 X |

FOREIGN PATENT DOCUMENTS 2080666 2/1982 United Kingdom.

OTHER PUBLICATIONS

Eric Norrman, "Selen-ett livsnodvandigt sparamne", Uppsala, 1983, pp. 11 and 22.
Chemical Abstracts, vol. 103, (1985), Abstract No. 117.67g.
Can. J. Fish, Aquat. Sci., 1985, 42(6), 1132–43.

Primary Examiner—Tom Wyse
Attorney, Agent, or Firm—Burns, Doane, Swecker & Mathis

[57] ABSTRACT

The present invention relates to a method for treating lakes with selenium with the intention of lowering the mercury content of fish, and is characterized by supplying to the lake selenium in the form of a selenium salt incorporated in a carrier material capable of dispensing selenium to the surrounding water substantially continuously and in a controlled manner. The carrier material is preferably a rubber-based or silicon-based and biologically degradable material. There is preferably maintained an effective selenium level of beneath 10 μg.

11 Claims, 3 Drawing Sheets

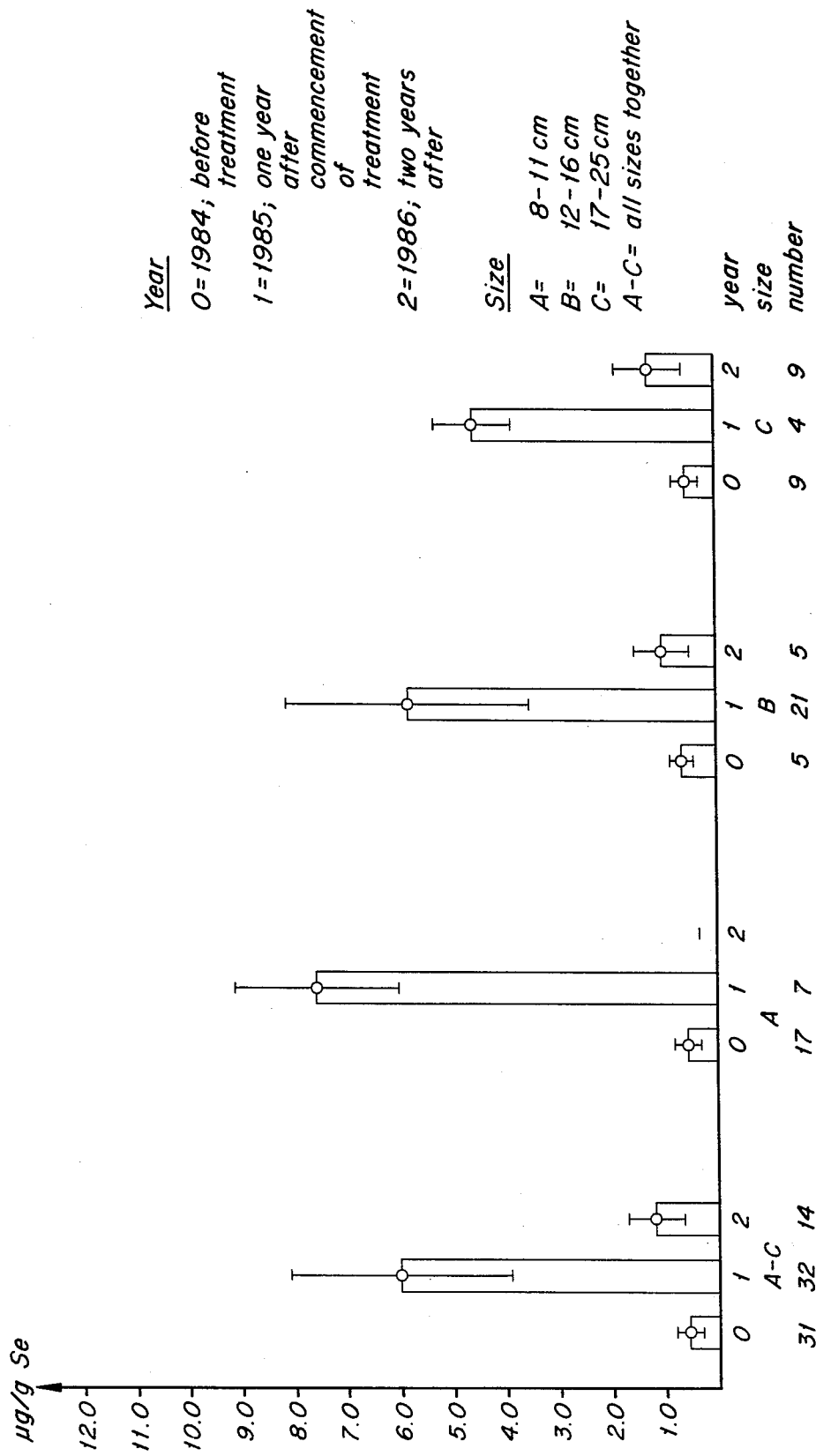

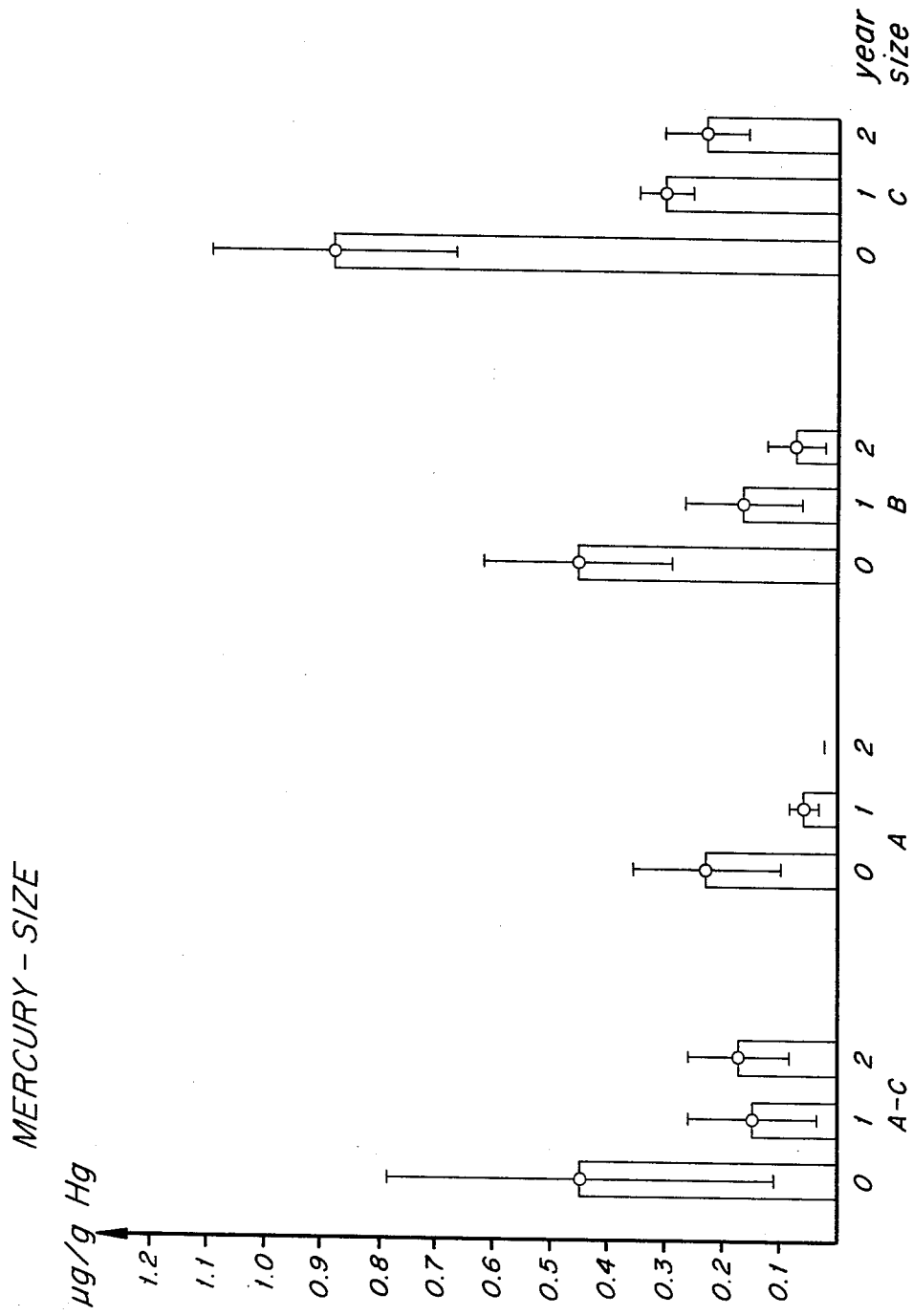

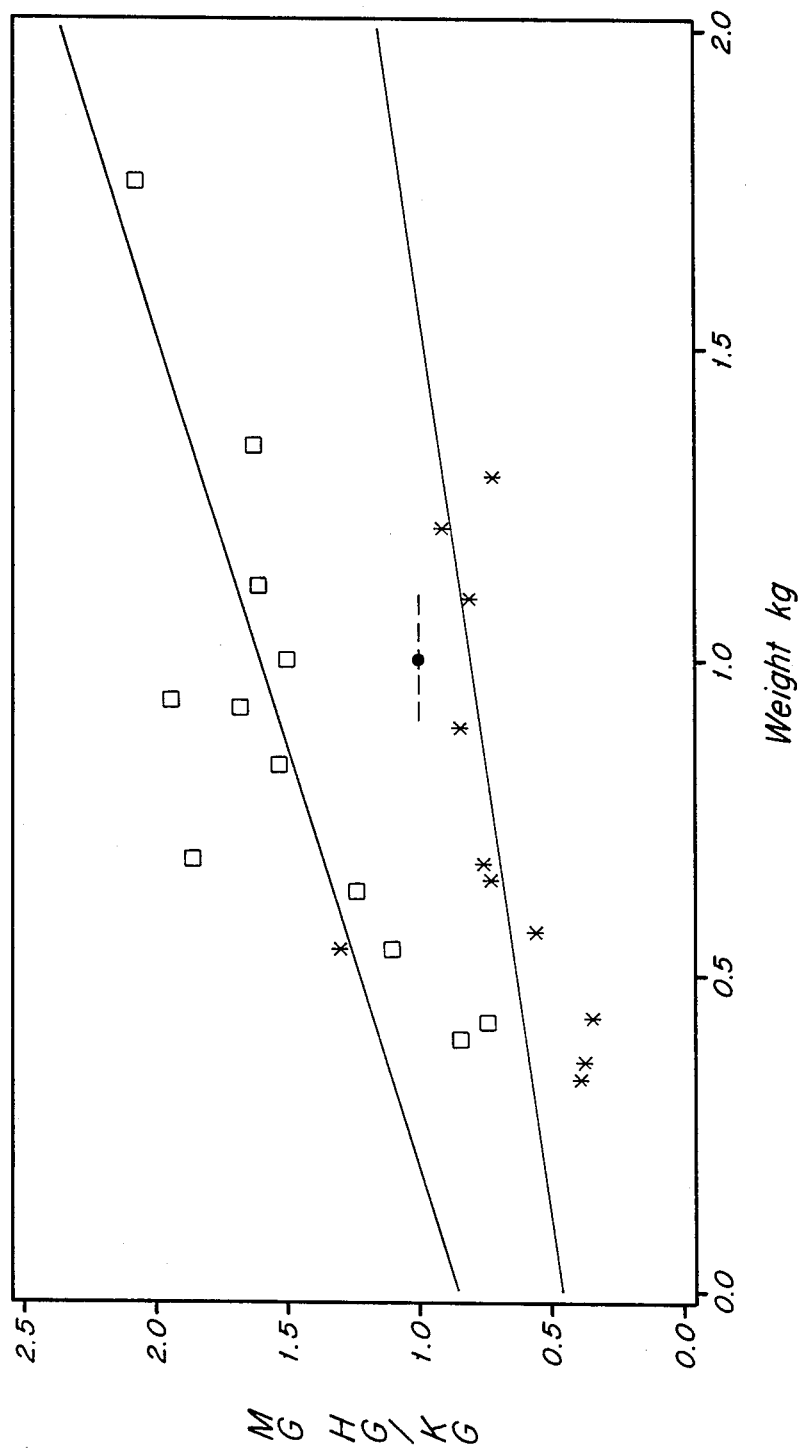

TREATMENT OF MERCURY CONTAMINATED LAKES

The present invention relates to a method for treating lakes with selenium, with the intention of lowering the mercury content of fish, and more particularly in order to lower the mercury content to a level below the so called blacklist limit.

Many Swedish lakes are today blacklisted with regard to the fish they contain, due to the high mercury content of the fish, which renders them totally inedible. In the case of pike, for example, the blacklist limit is 1.0 mg/kg mercury in muscle tissue.

It has long been known that selenium and mercury are able to interact in various contexts.

Experiments which showed that selenium has a protective effect against mercury poisons in rats were documented as early as the 1960s. Lawrence and Holoka (1981) have documented experiments carried in aquatic conditions and on limnocorrals to show the effect of selenium on zooplankton in a mercury-contaminated lake environment. Two concentrations, 0.1 mg Se/l and 1.0 mg Se/l were used in these experiments. Due to the negative effects on the zooplancton population at the two concentrations used, however, the selenium concentrations were judged to have been too high for it to be possible to use selenium safely in order to improve the mercury situation in the lake investigated.

Experiments carried out by Klaverkamp et al (1983) have shown that a selenium concentration in water of about 11 mg/l will result in the death of 50% of the pike present after 75 hours exposure. The experiments also established a trend towards a decrease in the mercury content of fish at low selenium concentrations (1 $\mu$g Se/l), whereas at high selenium concentrations (100 $\mu$g Se/l) a sustained mercury level was obtained. Corresponding results were obtained with experiments in which the mercury was tagged with radioactive labels, these experiments showing a smaller accumulation of mercury in muscle tissue at low selenium concentrations (1 and 10 $\mu$g Se/l) and a sustained mercury level at high selenium concentrations (100 $\mu$g Se/l).

Lakes that had been contaminated by mine-water were investigated by Lindestrom and Grahn in 1982, wherein it was found that the sediment contained high proportions of mercury carried by the mine-water. Small quantities of mercury (0.08 $\mu$g/kg) were established in pike upon comparison with uncontaminated lakes in the north and central Sweden, with a mercury content of 0.23 and 0.53 $\mu$g/kg respectively. A strongly negative correlation between the degrees of metal contamination in sediment and the mercury content of pike was also established. The reason for this was not discussed, however, and neither was any attempt made to explain the phenomenon or any indication given as to its cause.

The effect of selenium on the bioaccumulation of mercury in fish has been studied in Canada. In 1983 several articles were published in which Turner, Rudd and Switch reported tests that were carried out on experimental ecosystems while using selenite in three concentrations of 1, 10 and 100 $\mu$g Se/l respectively. The extent to which mercury accumulated was reported to have been lowered in a number of biota in a concentration-dependent manner, with the highest mercury reduction at 100 $\mu$g Se/l. The extent to which the mercury content of fish was reduced to be proportional to the accumulated selenium.

The literature is very meager on the mechanism surrounding the selenium absorption-mercury accumulation in fish. It is an obvious assumption, however, that separate receptors are found which control the amount of selenium and mercury absorbed. Experimental results are available which can be interpreted as showing that the number of mercury receptors increases with the age of the fish. These receptors can be "occupied" by mercury proportionally in relation to the mercury concentration in the environment.

The consequences of selenium addition is very complex in regard to mechanism and chemical equilibrium effects and it is today not fully investigated in all its aspects of biochemical effect on fauna as well as effects on the whole lake system.

The reduction of bioaccumulation of mercury in fish is likely to be due mainly to a change in the chemical equilibrium system of mercury in the lakes. Mercury and selenium form a very stable compound, mercuryselenide, and the mercury fixed to selenium is therefore not likely to be available for biocirculation in the lake system. Another important effect of selenium is that the selenium is likely to be active in the fish's biochemical system in accelerating the breaking down and extension of the mercury bond in the fish muscle. This conclusion is verified by the fast responce of mercury decrease on addition reported below.

The object of the present invention is to provide a method for treating mercury contaminated lakes with selenium without needing to use inhibitively large selenium additions in order to lower the mercury content of fish rapidly and in a manner which can be applied in practise.

To this end the invention is characterized by the steps set forth in the following claims.

BRIEF DESCRIPTION OF THE DRAWINGS

FIG. 1 is a diagram illustrating the level of selenium in perch taken from certain Swedish lakes in 1984, 1985 and 1986.

FIG. 2 is a diagram illustrating the level of mercury in perch taken from certain Swedish lakes in 1984, 1985 and 1986.

FIG. 3 is a diagram illustrating the mercury content of pike taken from certain lakes in Sweden before and after treatment with selenium.

Thus, the lake is treated with a selenium salt which is incorporated in a carrier or matrix material which will allow the selenium salt to leach continuously therefrom in a controlled manner, therewith dispensing selenium to the surrounding lake water. The carrier material may be of any suitable kind, and the choice of material used is in no way critical, provided that the selenium leaches from the matrix is a controlled fashion when in use. However, the selenium salt is preferably incorporated in a rubber based or selenium based material. The material is preferably biologically degradable.

The selenium level is preferably maintained beneath 10 $\mu$g of selenium for each liter of water treated. The lowest selenium level at which the water can be treated effectively depends entirely on the local conditions. A preferred selenium level of 1–3 $\mu$g Se/l is recommended. The selenium is preferably charged to the water in batches during the course of treatment. The selenium content in water volume is first brought to the desired (effective) level, beneath 10 $\mu$g/l, preferably 1-3 μg/l, in a relatively short period of time, for example from 0.5 to one month. The selenium salt will then leach from the carrier material in a manner to maintain a uniform level of selenium in the lake. The carrier material is preferably removed from the lake up completion of the treatment.

The invention will now be described in more detail with reference to a working example.

EXAMPLE

In 1984 it was undertaken to lower the mercury content of lake fish, or at least to reduce the amount of mercury intake, by treating lakes with selenium. The lakes to be treated during this project were chosen by the County Administration Board and Boliden Metall AB. The criteria decided upon were fulfilled in the main by the lake "Öltertjärn" lying between Skellefteå and Burträsk in the County of Västerbotten, Sweden. The following data was taken from the lake.
* surface: 15 ha
* volume: 450 000 m³
* precipitation area: about 500 000 m³
* pH: 6.2

The project was started in June 1984, by analyzing samples of water and fish taken from the lake, in order to establish reference values.

The lakes were then treated with selenium, in the form of sodium selenite incorporated in respective matrices of styrene/butadiene rubber, which was found to provide a slow and controlled distribution of the selenium to the surround water. The rubber matrices comprised 40, 45 and 50% by weight sodium selenite (corresponding roughly to 18, 20 and 22% Se), with the remaining portion of respective matrices or carriers consisting of an inert, biologically degradable, synthetic rubber and being in block form. The rate at which selenium leached from respective carriers was controlled through the amount of selenium used and the size of the rubber blocks used.

The rubber blocks incorporating the selenium were placed in four closed nylon-net sacks and the sacks lowered into the lake at suitable locations thereacross, to a depth of about 1 meter between the surface of the lake water, therewith dispensing the selenium to the surrounding water. The sacks were anchored in a position with the aid of lead weights and were marked with bouys.

The original selenium and mercury contents of Öltertjärn before starting the project, were 0.4 μg/l in the case of selenium and 0.03 μg/l in the case of mercury. The first samples of water for analysis were taken after a treatment period of one month, whereupon it was found that the selenium had circulated well throughout the lake and that the lake overall contained roughly the same amount of selenium.

The selenium recovered in the water volume was only about 55% of the amount introduced into the lake. The remainder of the selenium had either absorbed in the sediment and on suspended organic material, transformed into volatile substances, bound to the biomass, or had been discharged from the lake together with the outflow.

It was found that the desired selenium content of the lake could be maintained with small variations. The analyses carried out on water samples are summarized in Table 1 below. The double samples were taken from a depth of 1 meter.

TABLE 1

| Date | Se μg/l | pH | Conductivity ms/m |
| --- | --- | --- | --- |
| 840905 | 5.3 | | |
| 850416 | 4.7 | 6.0 | 3.7 |
| 850619 | 2.2 | 6.3 | |
| 870829 | 3.4 | 6.4 | 2.9 |
| 860603 | 2.3 | 6.1 | 2.8 |

During this period the selenium was metered to the surrounding water with a starting point from earlier analyses and on the basis of the amount of selenium which could be assumed to bind to the sediment and to the biomass and also on the basis of the amount of selenium which could be expected to disappear together with the outflow, while also taking the inflow into account. During the first year of treatment, 76% of the selenium changed to the lake was bound to the sediment, biomass and removed from the system into the surroundings, that is if it assumed that the hydrographical data obtained and used with regard to the precipitation area is correct. The corresponding figure during the second treatment year was 57%. Samples of water were analysed with regard to their selenium content.

Pike and perch caught during the reference year of 1984 and during the treatment year of 1985 and 1986 were analysed for their selenium and mercury contents. The results of these analyses carried out on perch are shown in diagram form in FIG. 1 and FIG. 2 respectively. It will be seen upon comparison that the mercury content of perch had fallen markedly for each year of treatment. The decrease is, as well as the reference levels of mercury, dependent on size. The selenium content of perch increased during the first treatment year, followed by a decreased to 1.1 mg/kg during the second year.

The analysis showed that the mercury content of pike had fallen markedly after only one year of treatment. The mercury content was reduced by 50% over the whole weight range (i.e. all sizes of pike), and now lies beneath the blacklist level, as evidenced in the FIG. 3 diagram. The selenium level of pike has changed in accordance with that of perch.

In order to illustrate still further the ability of selenium to improve the mercury situation in fish when carrying out the method according to the invention, a comparison was made between the ratio Hg/weight in pike and perch before and after the selenium treatment process, on the basis of data obtained from the Öltertjärn project. Before treating the lake in accordance with the invention, the average value of Hg/weight for pike was 1.9, and after the treatment process 1.1 with the corresponding result for perch being 23 decreasing to 4 (mg/kg:kg). Since there is no reason to believe that there was an increase in growth with a retained mercury content after treating with selenium, to decrease in the ratio Hg/weight can only be explained by a reduction in the mercury content of the fish.

Thus, the amount of mercury taken up by the lake fish can be reduced by introducing selenium into lakes in accordance with the present invention. This reduction in mercury uptake is accomplished by introducing into the water relatively small quantities of selenium which will not negatively affect other biota.

We claim:
1. A method for treating bodies of water with selenium so as to lower the mercury content of fish com- prising introducing into the water selenium in the form of a selenium salt incorporated in a carrier material so as to dispense selenium to the surrounding water essentially continuously and in a controlled manner.

2. The method of claim 1 wherein the carrier material is a rubber-based or silicon-based biologically degradable material.

3. The method of claim 2 wherein an effective selenium level in the water is maintained beneath 10 ug/l.

4. The method of claim 3 wherein an effective selenium level of 1-3 ug/l is maintained in the water.

5. The method of claim 4 wherein selenium is dispensed to the water in stages.

6. The method of claim 5 wherein the selenium level is first raised to the desired level in a short period of time and a substantially uniform selenium level is then maintained.

7. The method of claim 1 wherein an effective selenium level in the water is maintained beneath 10 ug/l.

8. The method of claim 7 wherein an effective selenium level of 1-3 ug/l is maintained in the water.

9. The method of claim 8 wherein selenium is dispensed to the water in stages.

10. The method of claim 1 wherein selenium is dispensed to the water in stages.

11. The method of claim 1 wherein the selenium level is first raised to the desired level in a short period of time and a substantially uniform selenium level is then maintained.

* * * * *